UNITED STATES PATENT OFFICE.

JUSTUS WOLFF, OF WYKE, NEAR BRADFORD, AND RALPH BETLEY, OF WIGAN, ENGLAND.

IMPROVEMENT IN PROCESSES OF MAKING DYES FROM NAPHTHALINE.

Specification forming part of Letters Patent No. 188,217, dated March 6, 1877; application filed January 23, 1877.

*To all whom it may concern:*

Be it known that we, JUSTUS WOLFF, of Wyke, near Bradford, consulting and engineering chemist, and RALPH BETLEY, of Wigan, England, analytical and consulting chemist, have invented Improvements in the Production of Dyes from Naphthaline and its Derivatives, of which the following is a specification:

This invention relates to the production of dyes obtained from the products which are yielded by substitution of one hydrogen atom in naphthaline, or in its suitable derivatives, by one molecule of benzole, or of any of its suitable derivatives, or of any of the suitable homologues of benzole, or of any of their suitable derivatives, and by means of energetic oxidation either with chromic acid or permanganic acid, or chloric acid or sulphuric acid, (followed by treatment with caustic alkali,) or other suitable oxidizing agent, and, finally, oxidation by forming sulpho-acids, or substitutions of the before-mentioned compounds with chlorine, bromine, iodine, nitrous acid, cyanogen, &c., and subsequently treating with caustic soda or potash.

For the purpose of carrying out this invention we take, for example, one equivalent of naphthaline mixed with one equivalent of dichlor benzole, and two equivalents of zinc powder, and heat this mixture in strong closed vessels at a temperature of about 220° Celsius for about twelve hours. The mass thus obtained we treat with about three times its weight of acetic acid, (glacial acetic acid being preferred,) in order to dissolve it, and add, while warm and with slight and cautious agitation, and in small quantities at a time, chromic acid until no further reaction takes place; then we add to this mixture about three to four times its weight of cold water. The mass is then filtered off, and the residuum on the filter well washed, dried, and dissolved in about three or four times its weight of fuming sulphuric acid, at a heat of from about 220° to about 230° Celsius, until it is ascertained by a drawn sample that it completely dissolves in water, (with the exception of carbonized matters,) which will be usually accomplished in about two hours' time. The resulting substance we treat with water, neutralize with quicklime, boil it, filter, if necessary, evaporate, and treat the evaporated solution with caustic soda (in solution) equal to about three times the weight of the substance, which has been dissolved in sulphuric acid for about four to six hours at 170° to 200° Celsius, until it is ascertained by a sample treated with excess of acid that the mass does not show any increase of precipitate created by the acid; then we dissolve the resulting mass in water, neutralize it with hydrochloric acid, filter, and wash. The material so obtained is ready for dyeing and printing purposes.

Another example is as follows: We take one equivalent phthalic acid, (produced from naphthaline by energetic oxidation with permanganic acid, chloric acid, or nitric acid,) and mix it with one equivalent of dichlor benzole, and two equivalents of zinc, (in powder preferred,) and heat this mixture in strong closed vessels for about twelve hours at about 220° Celsius. The resulting mass is then dissolved in acetic acid, (glacial acetic acid being preferred,) and strongly oxidized in this solution, either with chromic acid, permanganic acid, chloric acid, or any other suitable oxidizing agent. After the reaction ceases we mix the material so obtained with water, filter, wash out, dry, and dissolve in fuming sulphuric acid at 220° to 230° Celsius for about two to four hours, until all the color-producing matter is soluble in water; then dilute with water, neutralize with lime, precipitate with soda-ash, soda-crystals, or caustic soda, boil, and filter, and evaporate with caustic soda in excess for several hours at about 170° Celsius, until it is ascertained by a sample treated with excess of acid that the mass does not show any increase of precipitate created by the acid; then we dissolve in water, neutralize with hydrochloric acid, and wash, the material so obtained being then ready for dyeing and printing purposes.

We claim—

The process of making dyes from naphthaline, and also from the derivatives therefrom, in which one atom of the hydrogen contained therein is substituted by one molecule of benzole, or its derivatives, or the homologues of benzole, or their derivatives, by first submitting the same to an oxidizing process, and, after separating the products of oxidation, submitting such products to a second oxidizing process, and, finally, to the action of an alkali, substantially in the manner hereinbefore described.

In witness whereof we have signed our names to this specification in the presence of two subscribing witnesses.

JUSTUS WOLFF.
RALPH BETLEY.

Witnesses:
WM. HY. WILLGOOSE,
THOS. TABERNER,
 Clerks to Mr. Byrom, Solicitor,
  31 King St., Wigan.